Patented Jan. 16, 1951

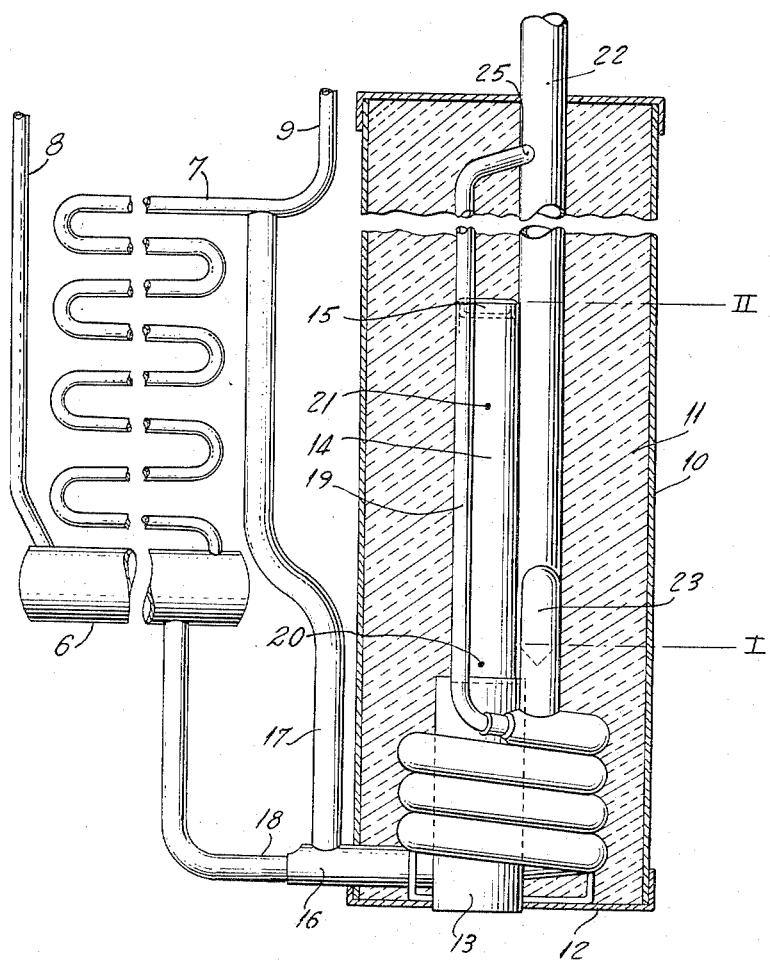

2,538,058

UNITED STATES PATENT OFFICE 2,538,058

ABSORPTION REFRIGERATION

Per Paul Sixten Bror Strandberg, Stockholm, Sweden, assignor to Aktiebolaget Elektrolux, Stockholm, Sweden, a corporation of Sweden Application March 15, 1945, Serial No. 582,927
In Sweden March 17, 1944

10 Claims. (Cl. 62—119.5)

This invention relates to an arrangement of elements in absorption refrigerating apparatus of the inert gas type, and more particularly to a vapor expulsion unit having an expelling element embedded in a body of heat insulating material, and a heat source arranged to expel refrigerant vapors from a column of absorption solution in such an element. The invention has among other objects to effect simplification of the vapor expulsion unit of the refrigerating apparatus, especially in small apparatus operated by electricity, and to reduce the losses of heat by radiation.

It has been previously proposed to expel refrigerant vapors from a column of absorption solution maintained in an expeller embedded in insulation by supplying heat to the lower part of the liquid column. The upper part of the column is not heated and is utilized for rectifying the vapors expelled in the lower part of the column. However, it has appeared that in effecting expulsion of sufficient quantities of vapors from such boiler, a substantial increase of the boiling temperature is necessary which will cause increased losses by radiation, particularly when the boiler is formed of piping welded to the exterior of the heating tube.

Further, it has been previously proposed to arrange the liquid heat exchanger of the refrigerating apparatus within the boiler insulation, namely, in the form of a pipe coil wound round the lower part of the heating element. In this manner the heat losses by radiation could be expected to decrease, but on the other hand the height of the heated part of the liquid column in the boiler useful for boiling away refrigerant will decrease, with the consequence that this lower part in such type of apparatus must be extended downwardly, whereby the decrease of the losses by radiation in a high degree will fail to appear. Besides, provision must be made to effect circulation of the liquid in the part of the boiler which extends downwardly in such manner.

The present invention overcomes the foregoing objections and effects simplification of the boiler structure by supplying heat to the middle part of the liquid column only, so that when the working fluids leave this part, vapors as well as absorption solution, such fluids pass through the upper and lower parts of the insulation, respectively, and are cooled by heat exchange with absorption solution richer and/or colder than the solution in the middle part of the column.

The invention will be described more fully hereinafter in connection with the embodiment diagrammatically illustrated in the accompanying drawing, and in this connection other characteristic features of the invention also will be set forth.

In the figure a unit assembly of elements, including the boiler of an absorption refrigerating apparatus, is diagrammatically shown in a side view and embedded in insulating material.

In the drawing 10 is a rectangular or cylindrical outer casing for holding the boiler insulation 11, such casing being formed of sheet metal or other suitable material resistant against heat. Through its bottom plate 12 a heating tube opens, such tube being arranged in a central position in the insulation. The single-walled heating tube comprises two parts 13 and 14, the lower part 13 of which has a somewhat larger diameter than the upper one and preferably is formed of a heat insulating fireproof material, such as a ceramic. The upper end of the heating tube is covered with a lid 15. Substantially concentric with the lower part 13 of the heating tube, a pipe conduit 16 forming the liquid heat exchanger of the apparatus is wound in a coil with even pitch. From the absorber vessel 6 of the apparatus a solution rich in refrigerant flows through the inner pipe of the exchanger, one part 18 of which communicates with the liquid circulation pump 19 of the apparatus. Suitably, the pump 19, together with the inner pipe 18 of the exchanger, may form a connected seamless pipe. For a certain distance from a level 20 to a level 21, the pipe 19 is welded, preferably by spot welding, to the part 14 of the heating tube which is made of iron pipe. The distance between such levels must attain a minimum of 50 mm. and may suitably be from 70 to 120 mm. The vapor conduit 22 leading to the condenser of the apparatus, not shown, is substantially centrally positioned in the boiler insulation down to the level I, where it is closed by pressing together and welding. From the outer jacket 16 of the heat exchanger, a conduit 23 extends to the vapor pipe and is connected thereto at a point which is situated higher than the highest point of the liquid heat exchanger. This conduit among other things serves as a circulating conduit for the heat exchanger. The pump conduit 19 opens into the vapor conduit at a point 25, situated somewhat above the upper end of the conduit 17 which is connected to the absorber 7 of the apparatus. In a well known manner, inert gas rich in refrigerant enters absorber vessel 6 through a conduit 8 and inert gas weak in refrigerant passes from the upper end of absorber 7 through a conduit 9.

The pipes 16, 23 and 22 form a continuous conduit, which in certain cases even may be formed of only one seamless pipe. In other cases the vapor conduit 22 may be directly connected to the upper part of the conduit 16, as by welding, whereby the communicating pipe 23 may be eliminated. In all embodiments the pump 19 raises or lifts liquid to maintain a liquid column in the conduit which extends up to a level in the vapor pipe 22 situated somewhat higher than the connection of conduit 17 to the upper part of the absorber 7. This liquid column constitutes one leg of a conduit, more or less of U-form in its function, the other leg of which is formed by the conduit 17. The first-mentioned leg is embedded in the single body of heat insulating material, and from the absorption solution flowing therethrough refrigerant vapors are expelled. A certain part of the quantity of refrigerant developed in the apparatus is expelled from solution in the heat receiving and vapor forming part of the pump conduit 19. Such vapor forming part of the pump pipe 19 is, as mentioned above, connected to the heating tube 14 in heat conducting relation therewith, such heating tube having an electrical heating element or cartridge inserted therein. At most 60 to 70%, but usually much below 50%, of the total quantity of vapor expelled is expelled in the pipe 19. The remaining quantity of vapor is expelled from the liquid column maintained in the conduit 22. According to the invention the application of heat is limited to a fixed part of such liquid column between the levels I and II, whereby the upper part of the column, namely, from the level II up to the liquid level in the conduit 22, will contain a solution of higher concentration and lower temperature, thus forming a liquid column effective for rectification of the vapors expelled between the levels I and II. Between the levels I and II the conduit 22 is welded to and in thermal relation with the portion 14 of the heating tube. The lower part of the liquid column in the downward direction of liquid flow has a gradually lower temperature due to the heat exchange with the solution flowing through the conduit 18 from the absorber vessel 7. As will be evident from the above, a reduction in temperature occurs in the working fluids or media leaving the heating or boiling zone of the liquid column, the gaseous component of which passes through the upper parts of the body of insulation in an upward direction toward the condenser of the apparatus, while the liquid component flowing downward through the conduit 16 passes through the lower parts of the body of insulation. In this manner a fall of temperature will be obtained of the media flowing in either direction from the warmest part of the apparatus, that is to say, the part of the conduit 22 situated between the levels I and II. The fall in temperature occurs, not only in a radial direction out toward the sides of the insulation, but also in an axial direction toward the top as well as the bottom limiting surfaces of the body of insulation. The quantities of heat delivered by the part 14 of the heating tube, which are not directly absorbed by the liquid column through the contact surface with the conduit 22, no longer constitute losses but are utilized in the apparatus parts situated above or below the zone I—II. It will be evident that, in accord with the invention, it is possible to dimension a vapor expulsion unit so that working media at no place leaves the parts enclosed in insulation at a temperature above that of the absorber and/or condenser, and in any case at a temperature which does not exceed 100° C.

In order to utilize fully the advantages of the invention, the heat source of the apparatus desirably should be arranged so that its warmest part is coextensive with the pipe-tube 14, whereby the highest temperature zone thereof corresponds with the zone situated between the levels I and II. In any case, the heat source desirably should be arranged so that the lower part 13 of the heating tube will have a temperature below, or in any case not substantially rising above, the temperature of the other conduits 16 and 22, extending or projecting from the insulation body. These requirements are met with in the easiest way when the heat source constitutes an electric heating element or cartridge formed in a suitable manner.

The electric heating cartridge generally comprises a body of ceramic material with an electric resistance wire wound on it, whereby the cartridge may be inserted into an electrically grounded metal socket. The electric heating cartridge according to the invention desirably should comprise an upper part, on which the resistance wire is wound and of substantially the same length as the pipe tube 14, and a lower part, possibly of a somewhat larger diameter, which fills up the part 13 and in which the electric conductors for the resistance winding are positioned. The upper part desirably should be enclosed in a metal socket and the lower part should be outside of the socket, thereby obtaining reduced heat conduction limited by the ceramic material. From the same point of view, it is desirable not to make the lower part of the body solid but to provide it with one or more axial notches.

The invention is not to be limited to the embodiment described above but may be varied in many ways within the scope of the basic inventive idea. This is especially applicable in regard to the division of the conduit containing the liquid column and embedded in the insulation. In the embodiment shown, the length of the part of the conduit containing the column of liquid for rectification, or more exactly the analyzer, the length of the boiler part, and the length of that part of the conduit positioned in the liquid heat exchanger, is in the ratio of 1:1:6. This relationship can be varied within relatively wide limits and in certain cases may have a ratio of 2:1:6 or 1:2:6.

I claim:

1. In an absorption refrigeration system of the type operable with inert gas, a vapor expulsion unit comprising a vertically extending conduit for maintaining a column of downwardly flowing absorption solution therein and having an intermediate section above the bottom and below the top of the liquid column therein, a supply pipe having a lower part in heat exchange relation with the lower part of the conduit and an upper part constituting a vapor lift pump connected to the conduit above the liquid level therein, said vapor lift pump having a heat receiving and vapor forming part disposed in its entirety exteriorly of the intermediate section of said conduit, a heating element having a heat conducting portion coextensive with the intermediate section of the conduit only and arranged in heat exchange relation with the conduit and heat receiving and vapor forming part of the pump, respectively, said heat receiving and vapor forming part comprising hollow tubing providing an unobstructed fluid passage which is defined solely by the inner wall surface of the tubing and in which vapor cannot freely pass liquid, and a single body of insulating material in which the conduit, supply pipe and pump tube are embedded to minimize the transfer of heat from said intermediate section whereby solution and vapour leaving the heated intermediate section are cooled by heat exchange with solution colder than the solution in the heated section, the lower parts of said supply pipe and said conduit which are in heat exchange relation being constructed and arranged so that vapor in all regions of such lower parts vents upwardly therefrom to said vapor lift pump and intermediate section of said conduit, respectively.

2. Apparatus in accordance with claim 1 in which the lower part of the conduit constitutes a liquid heat exchanger, the intermediate part constitutes a boiler and the upper part constitutes an analyzer, said heating element comprising a heating tube and said liquid heat exchanger being in the form of a helical coil disposed about said heating tube.

3. Apparatus in accordance with claim 1 in which the heating element is in the form of an upright single-walled cylindrical pipe having its upper end closed and positioned below the top of the liquid column whereby the portion of the liquid column above the heating element constitutes an analyzer, said cylindrical pipe and conduit at their exterior surfaces being in thermal relation along a line substantially parallel to the axis of the cylindrical pipe.

4. In absorption refrigeration apparatus of the inert gas type having a vapor supply line, a circuit for absorption solution including a liquid heat exchanger having first and second passages and a vapor expulsion unit comprising a boiler member and a pump pipe which is disposed exteriorly of said boiler member and at a higher level than said heat exchanger, said pump pipe being of substantially uniform diameter throughout its entire length to provide a path of flow for fluid in which vapor cannot freely pass liquid therein and including a heat receiving and vapor forming part, the first heat exchanger passage and pump pipe being connected for upward flow of solution successively therethrough, said boiler member at its upper end communicating with the vapor supply line and arranged to receive solution from said pump pipe, said boiler member and second heat exchanger passage being connected in said circuit to maintain a liquid column which flows downwardly therein, heating means for supplying heat to the heat receiving part of said pump pipe in a vertical range thereof to raise solution by vapor-liquid lift action and also at substantially the same vertical range to said boiler member only at a portion thereof at an intermediate region of the downwardly flowing liquid column which is removed from the upper and lower ends thereof, and insulating material in which said vapor expulsion unit and heat exchanger are embedded to minimize heat loss from the intermediate region of the liquid column and enable vapor and solution to pass from such intermediate region to other regions of the liquid column where these fluids become cooled by heat exchange effected with solution at a lower temperature than the solution in the heated intermediate region of the liquid column.

5. In absorption refrigeration apparatus of the inert gas type having a vapor supply line, a circuit for absorption solution including a liquid heat exchanger having first and second vertically extending passages and a vapor expulsion unit comprising a boiler member and a lift tube which is disposed exteriorly of said boiler member and at a higher level than said heat exchanger, the first heat exchange passage and lift tube being connected for upward flow of solution successively therethrough, said boiler member at its upper end communicating with the vapor supply line and arranged to receive solution from said lift tube, said boiler member and second heat exchanger passage being connected in said circuit to maintain a liquid column which flows downwardly therein, heating means comprising a single-walled heating tube for supplying heat to the exterior surface of said lift tube in a vertical range thereof for raising solution by vapor-liquid lift action and also at substantially the same vertical range to fluid in said boiler member only at a portion thereof at an intermediate region of the downwardly flowing liquid column which is removed from the upper and lower ends thereof, said liquid heat exchanger being in the form of a coil disposed about said heating tube which is provided with a closure member at the upper end thereof at a level below the liquid level in said boiler member, and insulating material in which said vapor expulsion unit and heat exchanger are embedded to minimize heat loss from the intermediate region of the liquid column and enable vapor and solution to pass from such intermediate region to other regions of the liquid column where these fluids become cooled by heat exchange effected with solution at a lower temperature than the solution in the heated intermediate region of the liquid column.

6. In absorption refrigeration apparatus of the inert gas type having a vapor supply line, a circuit for absorption solution including a liquid heat exchanger having first and second vertically extending passages and a vapor expulsion unit comprising a boiler member and a lift tube having a major portion of its length disposed exteriorly of said boiler member and at a higher level than said heat exchanger, the first heat exchanger passage and lift tube being connected for upward flow of solution successively therethrough, said boiler member at its upper end communicating with the vapor supply line and arranged to receive solution from said lift tube, said boiler member and second heat exchanger passage being connected in said circuit to maintain a liquid column which flows downwardly therein, heating means comprising a single-walled heating tube for supplying heat through such wall to said lift tube for raising solution by vapor-liquid lift action and also through the same wall to said boiler member only at a portion thereof at an intermediate region of the downwardly flowing liquid column which is removed from the upper and lower ends thereof, said liquid heat exchanger being so constructed and arranged that vapor in all regions of the first and second passages vent upwardly therefrom to said lift tube and boiler member, respectively, and insulating material in which said vapor expulsion unit and heat exchanger are embedded to minimize heat loss from the intermediate region of the liquid column and enable vapor and solution to pass from such intermediate region to other regions of the liquid column where these fluids become cooled by heat exchange effected with solution at a lower temperature than the solution in the heated intermediate region of the liquid column.

7. In absorption refrigeration apparatus of the inert gas type having a vapor supply line, a circuit for absorption solution including a liquid heat exchanger having first and second passages and a vapor expulsion unit comprising a liquid circulator and a heat receiving member in which vapor is expelled from solution by heating, said circuit including piping providing the first heat exchanger passage and liquid circulator which is connected for upward flow of solution successively therethrough, said heat receiving member at its upper end communicating with the vapor supply line and arranged to receive solution from said circulator, additional piping providing said member and second heat exchanger passage which is connected in said circuit to maintain a downwardly flowing liquid column therein, heating means arranged to supply heat to said member only at a portion thereof at an intermediate region of the liquid column, said heating means being spaced from and in poor heat exchange relation with upper and lower regions of said downwardly flowing liquid column so that expelled vapor in the intermediate region will rise and pass through the upper region of the liquid column in which analyzing action can be effected and weakened absorption solution will flow downwardly from the intermediate region through the lower region of the liquid column in the second heat exchanger passage and give up heat to upwardly flowing solution in the first heat exchanger passage, and insulating means arranged to minimize heat loss from the intermediate region of the liquid column and enable vapor and solution to pass upwardly and downwardly, respectively, from such intermediate region to substantially cooler regions to promote analyzing of vapor in the upper region and heat transfer from weakened solution in the lower region, the piping providing said heat exchanger passages being arranged to vent substantially all vapor from the latter to said circulator and heat receiving member, respectively, said insulating means serving to maintain said heating means in poor heat exchange relation with the upper and lower regions of said downwardly flowing liquid column.

8. In absorption refrigeration apparatus of the inert gas type having a vapor supply line, a circuit for absorption solution including a liquid heat exchanger having first and second passages and a vapor expulsion unit comprising a liquid circulator and a heat receiving member in which vapor is expelled from solution, said heat exchanger and vapor expulsion unit forming a compact vertically extending unitary structure including piping providing the first heat exchanger passage and higher located liquid circulator which is connected for upward flow of solution successively therethrough, said heat receiving member at its upper end communicating with the vapor supply line and arranged to receive solution from said circulator, additional piping providing said member and second heat exchanger passage which is connected in said circuit to maintain a downwardly flowing liquid column therein, heating means arranged to supply heat to said member only at a portion thereof at an intermediate region of the liquid column so that expelled vapor will rise and pass through an upper region of the liquid column in which analyzing action can be effected and weakened absorption solution will flow downwardly through a lower region of the liquid column in the second heat exchanger passage and give up heat to upwardly flowing solution in the first heat exchanger passage, said heating means comprising an upright single-walled heating tube above one level of which said circulator is disposed exteriorly of an upper tube part and below which said liquid heat exchanger is disposed about a lower tube part and in the form of an upright coil and a single upright body of insulating material having substantially the same horizontal cross-sectional area throughout its height in which said heat exchanger and vapor expulsion unit are embedded to minimize heat loss from the intermediate region of the liquid column and enable vapor and solution to pass upwardly and downwardly, respectively, from such intermediate region to substantially cooler regions to promote analyzing of vapor in the upper region and heat transfer from weakened solution in the lower region.

9. In an absorption refrigeration system of the type operable with inert gas, a vapor expulsion unit comprising a vertically extending conduit for maintaining a column of downwardly flowing solution therein and having an intermediate section above the bottom and below the top therein, a supply pipe having a lower part in heat exchange relation with the lower part of the conduit and an upper part constituting a pump tube connected to the conduit above the liquid level therein, said tube having a heat receiving and vapor forming part in which vapor cannot freely pass liquid, a heating element having a heat conducting portion coextensive with the intermediate section of the conduit only and arranged in heat exchange relation with the conduit and heat receiving part of the pump, respectively, the intermediate section of the conduit and the heat conducting portion of the heating element being in the form of upright cylindrical pipes arranged with their peripheries in tangential contact, and a single body of insulating material in which the conduit, supply pipe and pump tube are embedded to minimize the transfer of heat from said intermediate section whereby solution and vapor leaving the heated intermediate section of the conduit are cooled by heat exchange with solution colder than the solution in the heated section.

10. In an absorption refrigeration system of the type operable with inert gas, a vapor expulsion unit comprising a vertically extending conduit for maintaining a column of downwardly flowing solution therein and having an intermediate section above the bottom and below the top therein, a supply pipe having a lower part in heat exchange relation with the lower part of the conduit and an upper part constituting a pump tube connected to the conduit above the liquid level therein, said tube having a heat receiving and vapor forming part in which vapor cannot freely pass liquid, a heating element having a heat conducting portion coextensive with the intermediate section of the conduit only and arranged in heat exchange relation with the conduit and heat receiving part of the pump, respectively, a single body of insulating material in which the conduit, supply pipe and pump tube are embedded to minimize the transfer of heat from said intermediate section whereby solution and vapor leaving the heated intermediate section of the conduit are cooled by heat exchange with solution colder than the solution in the heated section, the heating element having a heat conducting portion in heat exchange relation with the intermediate section of the conduit and a depending heat insulated portion extending outwardly through the body of insulating material, the lower parts of the conduit and supply pipe constituting a liquid heat exchanger which is in the form of a coil disposed about the depending heat insulated portion of the heating element within the body of insulating material.

PER PAUL SIXTEN BROR STRANDBERG.

REFERENCES CITED

The following references are of record in the file of this patent:

UNITED STATES PATENTS

| Number | Name | Date |
|---|---|---|
| 1,613,629 | Von Platen | Jan. 11, 1927 |
| 1,693,553 | Munters | Nov. 27, 1928 |
| 1,729,355 | Munters | Sept. 24, 1929 |
| 1,736,871 | Backstrom | Nov. 26, 1929 |
| 2,212,111 | Blomqvist | Aug. 20, 1940 |

FOREIGN PATENTS

| Number | Country | Date |
|---|---|---|
| 557,311 | Great Britain | Nov. 15, 1943 |